United States Patent [19]
Christensen

[11] 3,726,353
[45] Apr. 10, 1973

[54] LIVESTOCK SCALE

[76] Inventor: Sheldon L. Christensen, 1963 E. 9th St., Fremont, Nebr. 68025

[22] Filed: July 26, 1971

[21] Appl. No.: 166,010

[52] U.S. Cl. ............... 177/208, 177/141, 177/245
[51] Int. Cl. ............................................. G01g 5/04
[58] Field of Search ............... 177/245, 208, 209, 177/141, 253, 254

[56] References Cited

UNITED STATES PATENTS

| 433,516 | 8/1890 | Charles et al. | 177/163 |
| 460,521 | 9/1891 | Boswell | 177/141 |
| 3,465,838 | 9/1969 | Kienzle et al. | 177/208 |

FOREIGN PATENTS OR APPLICATIONS

| 256,347 | 12/1964 | Australia | 177/245 |
| 1,182,541 | 1/1959 | France | 177/134 |
| 829,636 | 3/1960 | Great Britain | 177/245 |
| 1,029,238 | 5/1966 | Great Britain | 177/245 |
| 9,426 | 1911 | Great Britain | 177/208 |
| 745,137 | 2/1956 | Great Britain | 177/208 |

Primary Examiner—Richard B. Wilkinson
Assistant Examiner—Stanley J. Witkowski
Attorney—Hiram A. Sturges

[57] ABSTRACT

A livestock scale having a main supporting frame, a platform vertically movable on the main supporting frame, a measuring device bearing indicia and adapted to indicate the weight of a load on said platform, means interconnecting the measuring device and said platform in operative correlation, means enclosing the sides of a space above said platform sufficiently to prevent an animal on the platform from escaping.

8 Claims, 5 Drawing Figures

PATENTED APR 10 1973 3,726,353

INVENTOR.
SHELDON L. CHRISTENSEN
BY Hiram A. Sturges,
Agent

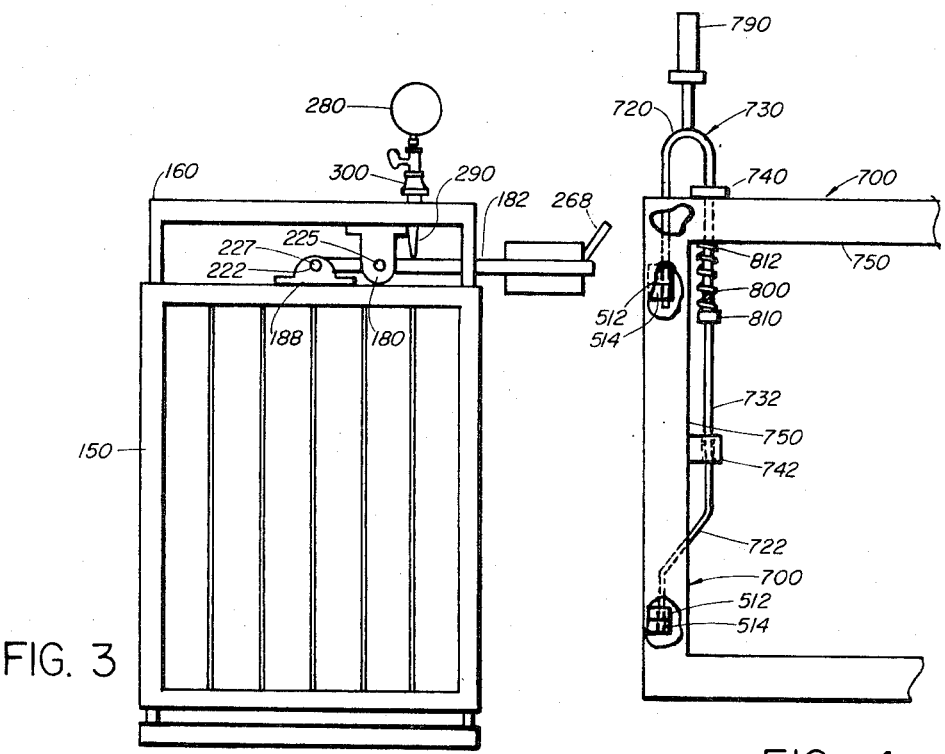
FIG. 3
FIG. 4
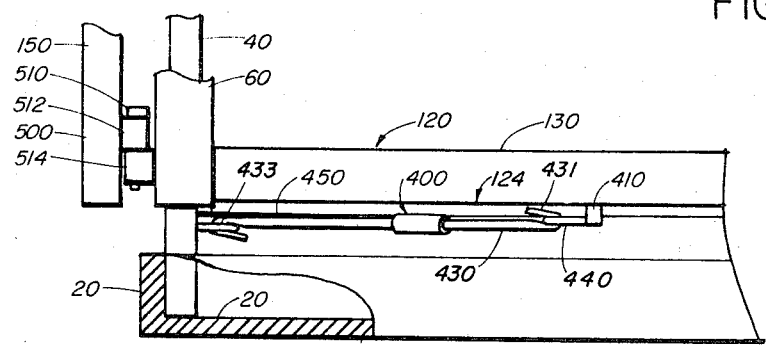
FIG. 5
INVENTOR.
SHELDON L. CHRISTENSEN
BY Hiram A. Sturges,
Agent

LIVESTOCK SCALE

FIELD OF THE INVENTION

This invention is in the field of scales for weighing livestock.

DESCRIPTION OF THE PRIOR ART

There has been a great need for a livestock scale capable of being built of a small size for practical ownership by a farmer so that it need not be transferred from farm to farm to justify its original cost, and so that the scale does not itself thereby become a carrier of disease from farm to farm.

There has been an additional need for a practical scale of economic construction to enable the farmer to determine the uniformity of the weight of his livestock in order to gain a better market price.

A particular need has been to provide a scale for livestock having a hydraulic gauge to eliminate the disadvantages of a spring scale, which latter is that its swinging needle must be allowed to cease its swinging before a reading can be taken, whereby valuable time is lost.

A hydraulic scale has been badly needed by the farmer for its advantage of being set to within a few pounds of the expected weight of a hog, for example, so that the scale weighs out the rest of the weight above the setting for greater speed of weighing.

A further need has been to provide a scale for the farmer in which the leverage of the scale can be set at the factory so that the indicia on its gauge reads in numbers which are directly pounds of weight of an animal on the scale.

SUMMARY OF THE INVENTION

A livestock scale having a main supporting frame, a platform vertically movable on the main supporting frame, a measuring device bearing indicia and adapted to indicate the weight of a load on said platform, means interconnecting the measuring device and said platform in operative correlation, means enclosing the sides of a space above said platform sufficiently to prevent an animal on the platform from escaping, the platform being supported by a counterbalancing lever with a weight which can be set into position for counterbalancing the majority of the weight of an animal to be weighed, the remainder of the weight of the animal on the scale being indicated by a hydraulic scale having a plunger in contact with and operated by the lever, doors at the forward and rearward ends of the platform being hinged to let an animal in and out respectively, a hinged pin removing system being provided for facilitating the quick opening of one or more of the doors, the platform being for preventing the platform from excessively frictionally engaging platform retaining posts by means of an alignment assembly, the assembly being adjustable for ease of manufacturing.

BRIEF DESCRIPTION OF THE DRAWING

FIG. 3 is a rear end view of the scale.

FIG. 4 is a detail showing the left end of a modified forward door of the scale shown with a removable hinge pin assembly mounted thereon, portions of the door being broken away to show portions of the assembly and hinge portions therebehind, bars of the door not being shown.

FIG. 5 is a side elevation of a forward right end portion of the scale with a portion of the base thereof broken away and other parts thereof shown in section.

DESCRIPTION OF THE PREFERRED EMBODIMENT

Figure 1:
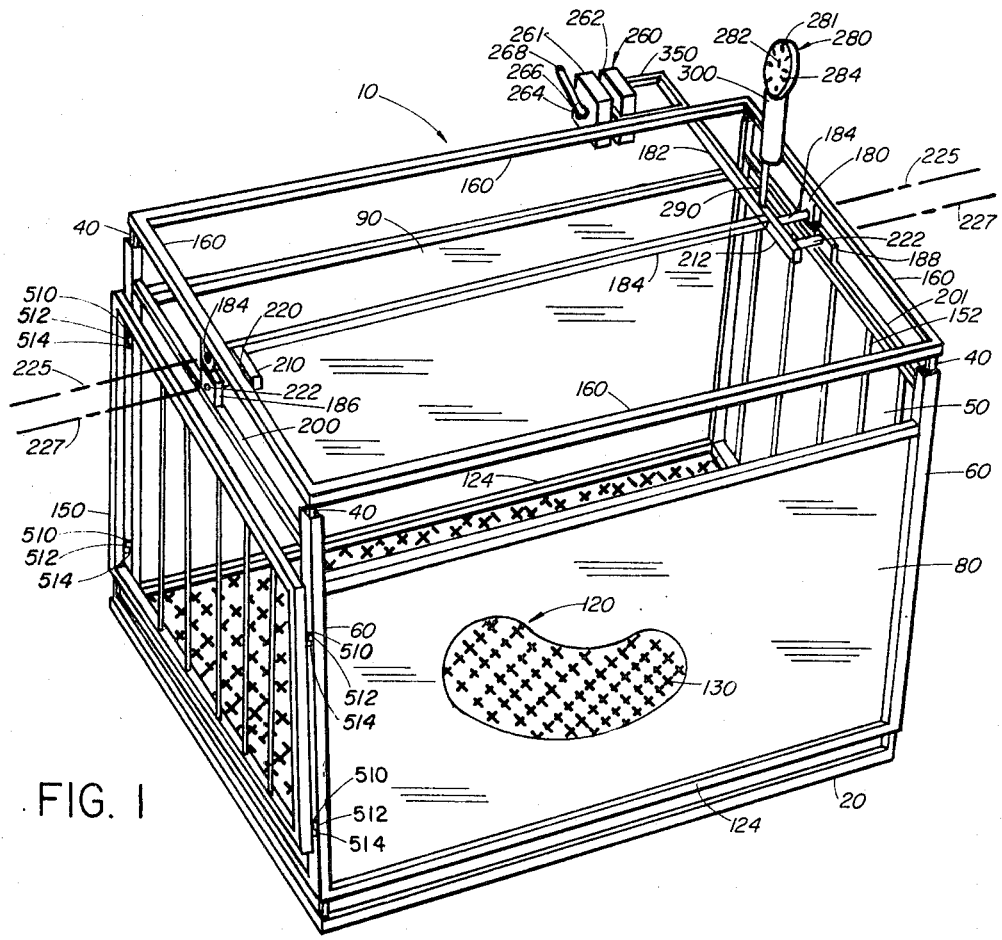
FIG. 1 is a perspective view of the livestock scale of this invention showing a portion of the side wall broken away in order to show the platform therebeneath.

The scale of this invention is shown at 10 and has a base 20 having an underside adapted to be rested on a horizontal surface. A plurality of vertical posts 40 preferably four in number are spaced for defining therebetween a cavity 50 in which an animal or other object to be weighed can be received.

A plurality of post following abutment sleeves 60 are mounted on the posts and adapted to slide upwardly and downwardly on and be guided by the posts. Right and left side walls 80 and 90 extend between adjacent post follower sleeves 60 and are attached thereto for forming two side walls of the cavity 50.

A platform assembly 120 is disposed between and interconnecting lower portions of the post follower sleeves 60.

The platform assembly 120 comprises a platform supporting frame 124 connected to the post follower sleeves 60, and also comprises a platform 130 disposed above and connected to said platform supporting frame 124.

Forward and rearward doors 150 and 152 are openably mounted on opposite ends of said scale whereby an animal can be led into the scale at the forward door, weighed, and then let out of the scale at the rearward door.

Frame members 160 interconnect side posts at the forward side and rearward side of the scale, the frame members 160 being disposed between the tops of the side posts.

A bearing 180 is mounted on the underside of one of the frame members 160 and has a lever 182 pivoted by an axle shaft 184 to the bottom thereof so that the lever 182 swings upwardly and downwardly in a vertical plane which is disposed from side to side across the scale.

An inner end of the lever 182 is secured to the axle shaft 184. The platform means has forward and rearward upper connectors 200 and 201 disposed connecting upper ends of the forward and rearward post followers respectively.

The axle shaft 184 is square except for its ends, which are cylindrical. The shaft 184 has thereon forward and rearward bars 210 and 212 and extending 90 degrees inwardly from the axle shaft 184 at points just slightly inwardly from the connectors 200 and 201. The connectors 200 and 201 have attached to their upper sides forward and rearward bearings 186 and 188 respectively.

The bars 210 and 212 have right ends which are pivotally attached respectively to the bearings 186 and 188 by means of pins 220 and 222 so that with the first axis 225 being defined as extending through the shaft 184, a second horizontal axis 227 is defined as being parallel to the axis 225 by extending through pivot pins 220 and 222.

As best seen in FIG. 1, as an animal comes onto the platform, the platform will move downwardly causing post follower sleeves 60 to move downwardly, pulling pins 220 and 222 downwardly which pulls bars 210 and 212 downwardly at their right ends causing the outer or left end of the lever 182 to move upward against the pull of a counter-balance weight assembly 260 attached thereto.

A hydraulic gauge is shown at 280 having indicia 281 on its scale face 284 and its needle 282 rotates in response to an engagement of a vertically sliding plunger 290 at the lower end of the scale 280, such sliding happens since the plunger 290 is vertically movable in a carrier frame 300 attached to adjacent frame member 160 and the lower end of the plunger engages the lever 182.

The weight assembly 260 does not ride directly on the arm 182, but instead, a rod 350, best seen in FIG. 1, is attached to the lever 182 and has a portion 351 parallel to and offset to one side of the lever 182.

The weight assembly 260 has two half portions 261 and 262 threadedly held together by a bolt 264 and clamped toward each other by a nut 266 having a hand lever 268 attached to it, all as best seen in FIG. 1.

Figure 2:
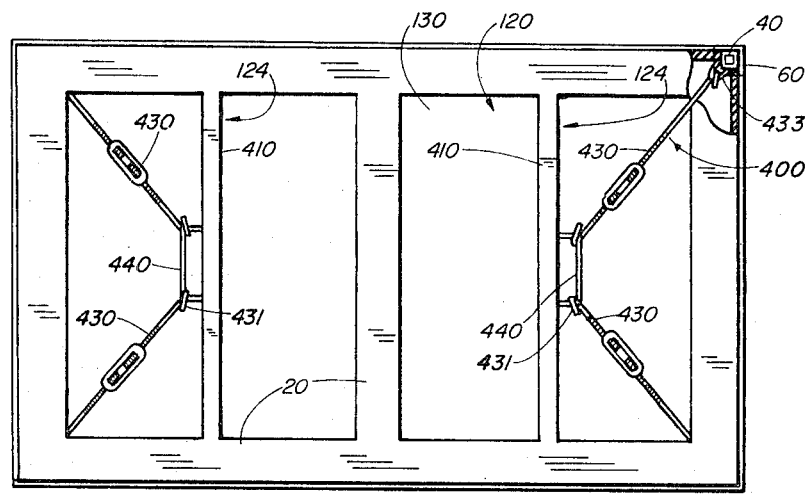
FIG. 2 is a bottom plan view of the scale shown with a portion thereof broken away.

FIG. 2 shows four alignment assemblies 400 for the purpose of aligning the platform 130 so that its sleeves 60 will not excessively frictionally engage or bind against the posts 40 so that a true weight of an animal is registered without an error due to such non-alignment friction.

Specifically, the platform frame work 134 has square tubes 124 at its sides and these are connected by a pair of cross braces or floor stringers 410 which are spaced apart, and each alignment assembly 400 has two attachment portions or turn-buckles 430 having end hooks 431, each extending from an attachment loop 433 welded to a respective post 40 at the bottom of such post, inwardly to attachment to an eye 440 fixed on the closest brace 410.

There are four alignment assemblies 400, each alignment assembly comprising a turn-buckle 430, a loop 433, and an eye 440.

There are two eyes 440 attached one at each of two braces 410 and extending forwardly from the forward brace 410 and rearwardly from the rear brace 410.

At the factory the turn-buckles 430 are adjusted so that the platform is held so that the sleeves 60 do not excessively frictionally engage any of the posts 40.

It is important to realize that the total movement up and down of the scale as an animal steps on it is less than one-fourth inch, perhaps as little as one-sixteenth inch. The turn-buckles 430, however, will allow as much as one and one-half inches of vertical movement of the platform without binding, this being because of the long arc of pivoting represented by the distance between the hooks of each turn-buckle.

It is intended that the platform be supported on the pins 220 and 222 with such perfect suspension that there is no tendency for the upper parts of the sleeve 60 to frictionally engage the posts 40, whereby the turn-buckles 430 finish the job so that the lower parts of the sleeves also do not engage the posts 40 and an ideal is accomplished.

Each abutment sleeve 60 is very close to a respective post 40 when there is an excessive side pressure on the platform assembly such as during shipment so as to protect the pins 220 and 222 and the bearings 186 and 188 from excessive strain.

For one way in which the end doors 150 and 152 can be mounted see FIG. 6, in which a right side follower sleeve 60 is shown and the outer square frame of an end door 150 is shown at 500 with hinge pins 510 specifically removable from hinge parts 512 on the door 150, and from hinge parts 514 on the forward sleeve 60 for causing the door to be openable from the respective side. Two such hinges are used for each side of the door, the lower hinge only on the right side being shown in FIG. 6.

The same door 150 is attached, as is not shown, to the left side post follower 60 in the same way with two other such hinges and other removable pins. Also the rear door 152 is similarly hinged. With this construction the doors 150 and 152 can be opened from either side and can be caused to be disposed in either of two partially open inclined positions for causing an animal to be guided from left to right onto the scale from the front or to be guided to right or left as the animal leaves the scale at the rear.

Referring now to FIG. 5, a different embodiment of the hinge system is there shown, and which is used in substitution for the hinge system shown in FIG. 6. In FIG. 5, a door frame is shown at 700, and it has mounted thereon hinge parts 512 and 514, similarly to the door 150 of FIG. 6. However, in the modification of FIG. 5, upper and lower hinge pin means 720 and 722, respectively, are shown and these are interconnected by a U-shaped connector 730, having a long vertical portion 732 slidably extending through openings in an upper carrier 740 and a lower carrier 742, the carriers being attached to the door frame 750 of the door 700.

A handle 790 is attached to the upper end of the U-shaped member 730, so that when the handle 790 is pulled upwardly, the hinge pins 720 and 722 will each be pulled slidably upwardly and outwardly of their hinge portions 512 and 514, respectively, so as to make it possible to open that side of the door 750 to which the hinge portions 512 are attached.

The hinge pins 720 and 722 are held in place in the hinge portions 512 and 514 by a compression spring 800 which at its lower end urges against a stop member 810 attached to the vertical part 732 of the U-shaped member 730. The upper end of the spring 800 engages a member 812 attached to the door frame 790, and through which the straight portion 732 slides freely. The hinge pins 720 and 722 are thus held in place and in a downward position, except at times when an operator pulls upwardly on the handle 790 for releasing the hinge pins from the hinge portions 512 and 514.

I claim:

1. A livestock scale having a forward and a rearward end and having a main supporting frame, a platform means vertically movable on the main supporting frame, a measuring device bearing indicia assisting in the indication of the weight of a load on said platform, means interconnecting the measuring device and said platform in operative correlation, means enclosing the sides of a space above said platform sufficiently to prevent an animal on the platform from escaping, said interconnecting means having a lever arm means pivoted on said frame and attachment means pivotally connecting said lever arm to said platform means for the pivoting movement of said lever arm means in two opposite directions simultaneously with respective upward and downward movements of said platform means, means urging said lever arm means in a direction for urging said platform upwardly, a hydraulic scale assembly mounted on said frame and having a plunger means engaging said lever arm means so that said scale reads in proportion to the position of said lever arm.

2. The combination of claim 1 further comprising: said platform means and said frame together defining a structural assembly, operable front and rear gate means at said forward and rearward ends respectively of and pivotally connected to said structural assembly.

3. The combination of claim 1 further comprising: said platform means and said frame together defining a structural assembly, said structural assembly having two sides between its forward and rearward ends, side enclosure means attached to said structural assembly and at the sides thereof to prevent animals from escaping out through said sides.

4. The combination of claim 1 in which said frame has at least three spaced vertical posts and in which said platform means has sleeve means attached thereto and sliding on and receiving said posts respectively.

5. The combination of claim 4 in which said frame has a top portion attached to the upper parts of said posts, a shaft having ends pivotally connected to said frame top portion at the forward and rearward ends thereof respectively for rotation of said shaft about a forward-to-rearward first horizontal axis, said lever arm means being fixed to said shaft and extending transversely thereto and swinging when said shaft rotates, forward and rearward bars having inner ends fixed to said shaft and extending away from a same side of said shaft, means pivotally connecting the other ends of said forward and rearward bars to said platform means at an upper portion of the forward and rearward ends thereof respectively for the swinging of said bars about a second axis in parallelism with and spaced from said first axis whereby as said platform lowers said bars swing down, said shaft rotates and said lever arm swings about said first axis.

6. The combination of claim 1 in which said lever arm means extends to that side of said first axis which is opposite said second axis as seen in top plan view, and a weight forming at least a part of said lever arm urging means, means adjustably attaching said weight to the outer end of the said lever arm means so that said weight can be changed with respect to said lever arm means at various distances from said first axis, said lever arm means with its weight being of sufficient size and said axes being sufficiently close as to uphold a major portion of a weight of said platform at a time when an animal to be weighed is on said platform, whereby said weight can be set in a position for counterbalancing the majority of the weight of an animal to be weighed and said hydraulic scale assembly can indicate the extent to which the weight of the animal exceeds the known weight unit which is counterbalanced by said lever arm means with its weight.

7. The combination of claim 1 in which said frame has at least three spaced vertical posts thereon and in which said platform has retaining means thereon positioned for engagement with said posts at times when said platform is caused to move excessively in a horizontal direction.

8. The combination of claim 1 further comprising the said platform means and said frame together defining a structural assembly, front and rear door means disposed at the forward and rearward ends respectively of said structural assembly, at least one of said door means having two pairs of cooperating hinge portions mounted on at least one of its sides, the said hinge portions of a pair being disposed one above the other and being attached one to said door and one to said structural assembly, the hinge portions of a pair having openings extending vertically therethrough and normally disposed in alignment, and a hinge pin assembly comprising upper and lower hinge pin means disposed respectively through said upper and lower pairs of hinge portions, a handle assembly interconnecting said hinge pins in a manner whereby when said handle assembly is raised both of said hinge pin means will simultaneously be lifted out of their said hinge portions for quick opening of the respective side of said door to speedily let an animal therethrough.

* * * * *